(12) United States Patent
Bowie

(10) Patent No.: US 10,094,507 B2
(45) Date of Patent: Oct. 9, 2018

(54) PIPE SEALING APPARATUS AND METHOD

(71) Applicant: STATS (UK) Limited, Aberdeen, Aberdeenshire (GB)

(72) Inventor: Angus George Bowie, Alloa (GB)

(73) Assignee: Stats (UK) Limited, Aberdeen, Aberdeenshire (GB)

( * ) Notice: Subject to any disclaimer, the term of this patent is extended or adjusted under 35 U.S.C. 154(b) by 59 days.

(21) Appl. No.: 15/223,052

(22) Filed: Jul. 29, 2016

(65) Prior Publication Data
US 2017/0030505 A1 Feb. 2, 2017

(30) Foreign Application Priority Data

Jul. 31, 2015 (GB) .................... 1513577.5

(51) Int. Cl.
*F16L 55/18* (2006.01)
*F16L 21/00* (2006.01)
*F16L 21/02* (2006.01)
*F16L 1/26* (2006.01)
*F16L 55/17* (2006.01)
*F16L 55/172* (2006.01)

(52) U.S. Cl.
CPC ............ *F16L 55/18* (2013.01); *F16L 1/26* (2013.01); *F16L 21/007* (2013.01); *F16L 21/022* (2013.01); *F16L 55/17* (2013.01); *F16L 55/172* (2013.01)

(58) Field of Classification Search
CPC . F16L 55/18; F16L 1/26; F16L 21/007; F16L 21/022; F16L 55/17; F16L 55/172
USPC ........... 138/99, 98, 114, 147, 151, 156, 165
See application file for complete search history.

(56) References Cited

U.S. PATENT DOCUMENTS

| 492,047 | A | * | 2/1893 | Harper et al. | ........ F16L 55/172 138/99 |
| 3,821,971 | A | * | 7/1974 | Christensen | ............ F16L 55/17 138/99 |
| 3,997,199 | A | | 12/1976 | Arnold | |

(Continued)

FOREIGN PATENT DOCUMENTS

| GB | 1297162 | 11/1972 |
| GB | 1464267 | 2/1977 |

(Continued)

OTHER PUBLICATIONS

United Kingdom Search Report for Application No. GB1513577.5 dated Jan. 29, 2016.

(Continued)

*Primary Examiner* — Craig Schneider
*Assistant Examiner* — David Deal
(74) *Attorney, Agent, or Firm* — Carlson, Gaskey & Olds, P.C.

(57) ABSTRACT

A pipe sealing apparatus, such as a split sleeve clamp, has a body including a first body portion and a second body portion. Each body portion includes axially extending flanges having bores for receiving bolts and nuts to secure the body portions together. The apparatus includes a seal arrangement, a lock arrangement, and an actuation arrangement including an actuation member configured to both actuate the seal arrangement and activate the lock arrangement. The lock arrangement is carried by the actuation member of the actuation arrangement.

19 Claims, 14 Drawing Sheets

(56) References Cited

U.S. PATENT DOCUMENTS

| | | | |
|---|---|---|---|
| 3,999,782 A | 12/1976 | Shotbolt et al. | |
| 4,006,921 A | 2/1977 | Mohr | |
| 4,109,945 A | 8/1978 | Manchester et al. | |
| 4,239,266 A | 12/1980 | Mynhier | |
| 4,290,632 A | 9/1981 | Manchester, Jr. et al. | |
| 4,330,143 A * | 5/1982 | Reneau | F16L 1/26 285/15 |
| 4,535,822 A * | 8/1985 | Rogers, Jr. | F16L 55/17 138/99 |
| 5,437,489 A * | 8/1995 | Sanders | F16L 55/1715 138/99 |
| 5,590,913 A | 1/1997 | Morris et al. | |
| 6,675,836 B1 * | 1/2004 | Gaston | F16L 55/17 138/97 |
| 8,631,829 B1 * | 1/2014 | Bennett | B29C 66/8284 138/104 |

| | | |
|---|---|---|
| 2005/0084327 A1 | 4/2005 | Chelchowski et al. |

FOREIGN PATENT DOCUMENTS

| | | |
|---|---|---|
| GB | 1477558 | 6/1977 |
| GB | 1535090 | 12/1978 |
| GB | 2186650 A | 8/1987 |
| JP | H06241358 | 8/1994 |
| JP | 2002098276 | 4/2002 |
| WO | 2009/003015 A1 | 12/2008 |
| WO | 2010/021754 A1 | 2/2010 |

OTHER PUBLICATIONS

European Search Report for EP Application No. 16181934.7 dated Dec. 14, 2016.

* cited by examiner

PIPE SEALING APPARATUS AND METHOD

REFERENCE TO RELATED APPLICATIONS

This application claims priority to United Kingdom Application No. 1513577.5 which was filed on Jul. 31, 2015.

FIELD

This invention relates to a pipe sealing apparatus and method. More particularly, aspects of the invention relate to an actuation arrangement for a pipe sealing apparatus, such as a pipe clamp or pipe connector, a pipe sealing apparatus including the actuation arrangement, and a method for sealing a pipe.

BACKGROUND TO THE INVENTION

In many industries, pipes or pipelines are utilized to transport fluid over distance. A variety of pipe sealing apparatus, equipment and techniques have been developed to facilitate the construction, repair or replacement of sections of the pipe with the aim of, amongst other things, minimizing disruption to operation of the pipeline.

In some instances, the pipe sealing apparatus may include a split sleeve repair clamp having body portions which are secured about the pipe or pipe section and which are provided with seals which seal around the outside of the pipe. In other instances, the pipe sealing apparatus may include a pipe connector for connecting two pipes or pipe sections. As in the repair clamp, the pipe connector is provided with seals which seal around the outside of the pipe.

While repair clamps and connectors are used in many applications, there are a number of drawbacks with conventional repair clamp and pipe connector designs. For example, in order to restrain axial separation loads generated by fluid in the pipe repair clamps and pipe connectors may use locks or slips to grip the pipe or pipes. In order to activate the locks and the seals, in one construction a compression flange may be utilized to apply an axial compression force on the seals and the locks to urge them radially into engagement with the pipe. However, this construction places the seals between the locks and the compression flange which results in the locks being housed inside the pressure boundary created by the seals. As a result, the lock load on the pipe is unsupported, resulting in long locks to prevent high stress on the pipe. The internal pressure also acts in parallel to the lock on the clamp, which can generate very high separation loads. Conventional clamp and connector designs also suffer from being cumbersome, heavy and expensive to manufacture.

SUMMARY

Aspects of the present invention include an actuation arrangement for a pipe sealing apparatus, a pipe sealing apparatus including the actuation arrangement and a method for sealing a pipe.

According to a first aspect, there is provided an actuation arrangement for a pipe sealing apparatus, such as a pipe clamp or pipe connector apparatus. The actuation arrangement includes an actuation member configured for location about a section of a pipe, the actuation member operatively associated with a seal arrangement of the pipe sealing apparatus such that axial movement of the actuation member towards the seal arrangement urges the seal arrangement into engagement with the pipe. The actuation arrangement includes a lock arrangement configured to secure the pipe sealing apparatus to the pipe, and the lock arrangement is disposed on the actuation member.

According to a second aspect, there is provided a pipe sealing apparatus including a body, a seal arrangement disposed on the body, and an actuation arrangement. The actuation arrangement includes an actuation member configured for location about a section of a pipe, and the actuation member is operatively associated with the seal arrangement such that axial movement of the actuation member towards the seal arrangement urges the seal arrangement into engagement with the pipe. The actuation arrangement includes a lock arrangement configured to secure the pipe sealing apparatus to the pipe, wherein the lock arrangement is disposed on the actuation member.

In use, the actuation member may be disposed between a body of the pipe sealing apparatus and the pipe, axial movement of the actuation member towards the seal arrangement actuating the seal arrangement by urging the seal arrangement radially inwards to seal on the pipe and outwards to seal on the body.

Beneficially, embodiments of the present invention provide a simple, efficient and cost effective mechanism which separates the lock activation and seal actuation and which permits the lock arrangement to be located outside of a pressure boundary created by the seal arrangement. For example, in embodiments of the present invention, the seal arrangement and the lock arrangement may be activated independently since by carrying the lock arrangement on the actuation member, the present invention permits the seal arrangement to be actuated without activating the lock arrangement. In contrast to conventional arrangements in which the locks are disposed within the pressure boundary provided by the seals, in embodiments of the present invention, the lock arrangement is disposed outside the pressure boundary provided by the seal arrangement. Amongst other things, this provides the benefit that the lock arrangement is not exposed to pipe fluid and so does not need to be compliant to the fluid chemistry as would otherwise be required. Whereas conventional arrangements used in subsea applications suffer from corrosion issues, for example corrosion of the actuation bolts used in the hydraulic actuation arrangement, embodiments of the present invention also provide for self-locking of the seal actuation and lock activation, such that the present invention is particularly beneficial in subsea applications.

The body of the pipe sealing apparatus may include a plurality of components. For example, in embodiments where the pipe sealing apparatus includes a clamp, such as a split sleeve clamp, the body of the pipe sealing apparatus includes a plurality of components.

The pipe sealing apparatus may include one or more face seal. For example, in embodiments where the pipe sealing apparatus includes a clamp, such as a split sleeve clamp, a face seal may be provided between mating faces of the clamp body portions.

In other embodiments, the pipe sealing apparatus may include a pipe connector.

The body of the pipe sealing apparatus may include a unitary body. For example, in embodiments where the pipe sealing apparatus includes a pipe connector, the body of the pipe sealing apparatus may include a unitary body.

As outlined above, the lock arrangement is carried by the actuation member which in particular embodiments the actuation member may include a cage or the like onto which the lock arrangement is disposed.

The actuation member may be moveably coupled to the pipe sealing apparatus and the actuation member may be moveable between a first position distal to or spaced from an end of the pipe sealing apparatus and a second position proximal to the pipe sealing apparatus. In particular embodiments, the actuation member may bear against the end of the pipe sealing apparatus in the second position. In use, movement of the actuation member from the first position to the second position may actuate the seal arrangement. However, as the lock arrangement is disposed on the actuation member, movement of the actuation member from the first position to the second position does not activate the lock arrangement, which may be activated separately.

In use, the actuation member and/or the lock arrangement may be configured so that the lock arrangement may move axially relative to the actuation member during activation of the lock arrangement. However, in particular embodiments, the actuation member and/or the lock arrangement may be configured so that the lock arrangement moves solely radially into engagement with the pipe. One or more retainer, such as a pin or the like, may be provided to hold the unactivated lock arrangement in position prior to activation.

The actuation member may include a body portion, such as a housing. The body portion of the actuation member may be configured for location between the outside of the pipe and the pipe sealing apparatus.

The actuation member may include a flange portion. The flange portion may be coupled to or formed by the body portion. In use, the flange portion may include or define a compression flange portion of the actuation member. The flange portion may be operatively associated with the seal actuation arrangement. At least one bore, and in particular embodiments a plurality of bores, may be formed in the flange portion, the bore or a plurality of the bores configured to receive an actuator of the seal actuation arrangement.

The actuation member may include an end portion. In use, the end portion of the actuation member engages the seal arrangement, axial movement of the actuation member urging the seal arrangement into engagement with the pipe. The end portion of the actuation member may include a flange portion, such as a flange ring or the like.

The actuation member may include at least one strut. The at least one strut may be disposed between the body portion and the end portion. In particular embodiments, the actuation member includes a plurality of struts. In such embodiments, the struts are circumferentially arranged and spaced. In particular embodiments, the strut or struts have a cross-shaped cross section.

The actuation member may be formed as a single component. For example, in embodiments where the pipe sealing apparatus includes a pipe connector, the actuation member may be a single component. In other embodiments, the actuation member may include two or more components. For example, in embodiments where the pipe sealing apparatus includes a clamp, such as a split sleeve clamp, the actuation member may include two or more components, at least one component being located in each clamp portion.

As outlined above, the lock arrangement is disposed on the actuation member and in particular embodiments, the lock arrangement includes a taper lock arrangement.

The lock arrangement may include a first, outer, lock member and a second, inner, lock member.

In use, the first, outer, lock member cooperates with the second, inner, lock member to urge the second lock member inwards into engagement with the pipe and thereby secure the pipe sealing apparatus to the pipe. Cooperation between the first lock member and the second lock member also drives the first lock member outwards to engage the body as an equal and opposite reaction to movement of the second lock member.

In particular embodiments, the first and second lock members each include a plurality of lock elements or segments.

Each lock element or segment of the first lock member may be disposed on a pair of the struts of the actuation member. Each strut of the actuation member may include an outer shoulder, the lock element or segment of the first lock member being disposed on the outer shoulders of the pair of struts on which the lock element or segment is disposed.

Each lock element or segment of the second lock member may be disposed on a pair of the struts of the actuation member. Each strut of the actuation member may include an inner shoulder, the lock element or segment of the second lock member being disposed on the inner shoulders of the pair of struts on which the lock element or segment is disposed. Thus, the lock elements or segments of the first and second lock members are, in particular embodiments, arrayed as a plurality separated by at least two struts of the actuation member, the lock elements or segments of the first, outer, lock member engaging on the outer shoulders of the struts and the lock elements or segments of the second, inner, lock member engaging on the inner shoulders of the struts. In use, when assembled unset, the opposing lock members will sandwich the struts on either side via the retainer. When the axial actuation load is applied, the lock members will be driven radially apart to engage with the pipe and the body, respectively.

The first lock member may be configured for axial movement relative to the actuation member, said axial movement urging the second member or members of the lock arrangement into engagement with the pipe. Beneficially, embodiments of the present invention provide a mechanism for activating the lock arrangement without impinging on the seal integrity. For example, the first lock member may be driven solely radially outwards to engage the body as an equal and opposite reaction to movement of the second lock member or members.

The first lock member may include a ramp profile. In use, axial movement of the ramp profile of the first lock member relative to the second lock member urges the second lock member radially inwards to grip the pipe. The taper of the ramp profile also provides a radial force on the first lock member driving it outwards to grip the body. The lock arrangement is thus self-locking. Once the first lock member has gripped the body and the second lock member has gripped the pipe, they prevent movement relative to the pipe and body. Even if the pipe separates, the ejection load will further engage the lock members with their respective surfaces. The second lock member traps the end portion of the actuation member and prevents release, even if the seal actuation force is released. This retains the seal pressure. The seal pressure which is retained by the inner lock acts to ensure the lock maintains load on the taper so in turn prevents lock release. Thus, once the seal and locks are activated, they self-lock each other.

The first lock member may be configured to grip the body when activated. For example, the outer surface of the first lock member may include teeth or other suitable profile to assist in gripping the body.

The second lock member may be configured to grip the pipe when activated. For example, the inner surface of the second lock member may include teeth or other suitable profile to assist in gripping the pipe.

In embodiments where the pipe sealing apparatus includes a pipe clamp, one or more lock element or segment of the first and second lock members may be disposed in a first body portion of the pipe sealing apparatus and one or more lock element or segment of the first lock member may be disposed in a second body portion of the pipe sealing apparatus. Beneficially, this facilitates assembly of the activation arrangement and/or the pipe sealing apparatus about the pipe.

In embodiments where the pipe sealing apparatus includes a pipe connector, the seal arrangement and lock arrangement can be released by applying additional axial load to the seal compression flange and then retracting the loose locks. Beneficially, this allows the connector to be tested.

As outlined above, actuation of the seal arrangement and activation of the lock arrangement may be achieved independently. The activation arrangement may include a lock activation arrangement. The activation arrangement may include a seal activation arrangement. The seal actuation arrangement in particular embodiments is independent of the lock activation arrangement.

In use, the lock activation arrangement may be coupled to the first lock portion of the lock arrangement and configured to translate the first lock portion axially relative to the second lock portion to urge the second lock portion into engagement with the pipe. The seal actuation arrangement may be configured to translate the actuation member towards the seal arrangement.

The lock activation arrangement may be mounted on, or coupled to, the actuation member.

The lock activation arrangement may include one or more actuator, such as a pin, bolt, screw, piston or the like. The actuator may be coupled to the first lock portion and configured to translate the first lock portion axially relative to the second lock portion to urge the second lock portion into engagement with the pipe.

In embodiments, where the first lock portion includes a plurality of lock members, the lock activation arrangement may include one or more actuator for each lock member.

In use, the actuators may be operable simultaneously or sequentially. Beneficially, providing for sequential operation of the actuators may provide flexibility in activation of the lock arrangement, for example but not exclusively permitting balancing of loads applied to the pipe by activating opposing actuators together.

The lock activation arrangement may include a mechanical lock activation arrangement. For example, the lock activation arrangement actuator may include one or more actuator screw, pin or bolt.

The lock activation arrangement may include a fluid powered activation arrangement. The seal activation arrangement may be hydraulically powered or pneumatically powered. For example, the lock activation arrangement actuator may include one or more piston member.

The seal actuation arrangement may be coupled to the pipe sealing apparatus and configured to translate the actuation member axially relative to the pipe sealing apparatus to urge the seal arrangement inwards into engagement with the pipe.

The seal actuation arrangement may be mounted on, or coupled to, the pipe sealing apparatus.

The seal actuation arrangement may include one or more actuator, such as a pin, bolt, screw, piston or the like. The actuator may be coupled to the pipe sealing apparatus.

The seal actuation arrangement may include a mechanical actuation arrangement. For example, the seal actuation arrangement actuator may include one or more actuator screw, pin or bolt.

The seal actuation arrangement may include a fluid powered actuation arrangement. The seal actuation arrangement may be hydraulically powered or pneumatically powered. For example, the seal actuation arrangement actuator may include one or more piston member. Beneficially, embodiments of the present invention permit fluid operation without additional mechanical restraints.

The seal arrangement may include a seal element.

In particular embodiments, the seal arrangement may include a plurality of seal elements.

The seal element may include a compression seal. In use, axial compression of the seal element causes the seal element to extend radially towards the pipe.

The seal arrangement may further include at least one face seal element.

The pipe sealing apparatus may take a number of different forms.

In some embodiments, the pipe sealing apparatus may include a clamp. For example, the pipe sealing apparatus may include a split sleeve clamp.

According to a third aspect, there is provided a method for sealing a pipe including the steps of locating an actuation arrangement for a pipe sealing apparatus, such as a pipe clamp or pipe connector apparatus, about a section of a pipe, moving an actuation member of the actuation arrangement axially towards a seal arrangement of the pipe sealing apparatus to urge the seal arrangement into engagement with the pipe, and activating a lock arrangement disposed on the actuation member to secure the pipe sealing apparatus to the pipe.

The seal arrangement and the lock arrangement may be activated sequentially. In particular embodiments, the seal arrangement may first be activated without activating the lock arrangement. However, the lock arrangement may in some embodiments be activated prior to activation of the seal arrangement.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
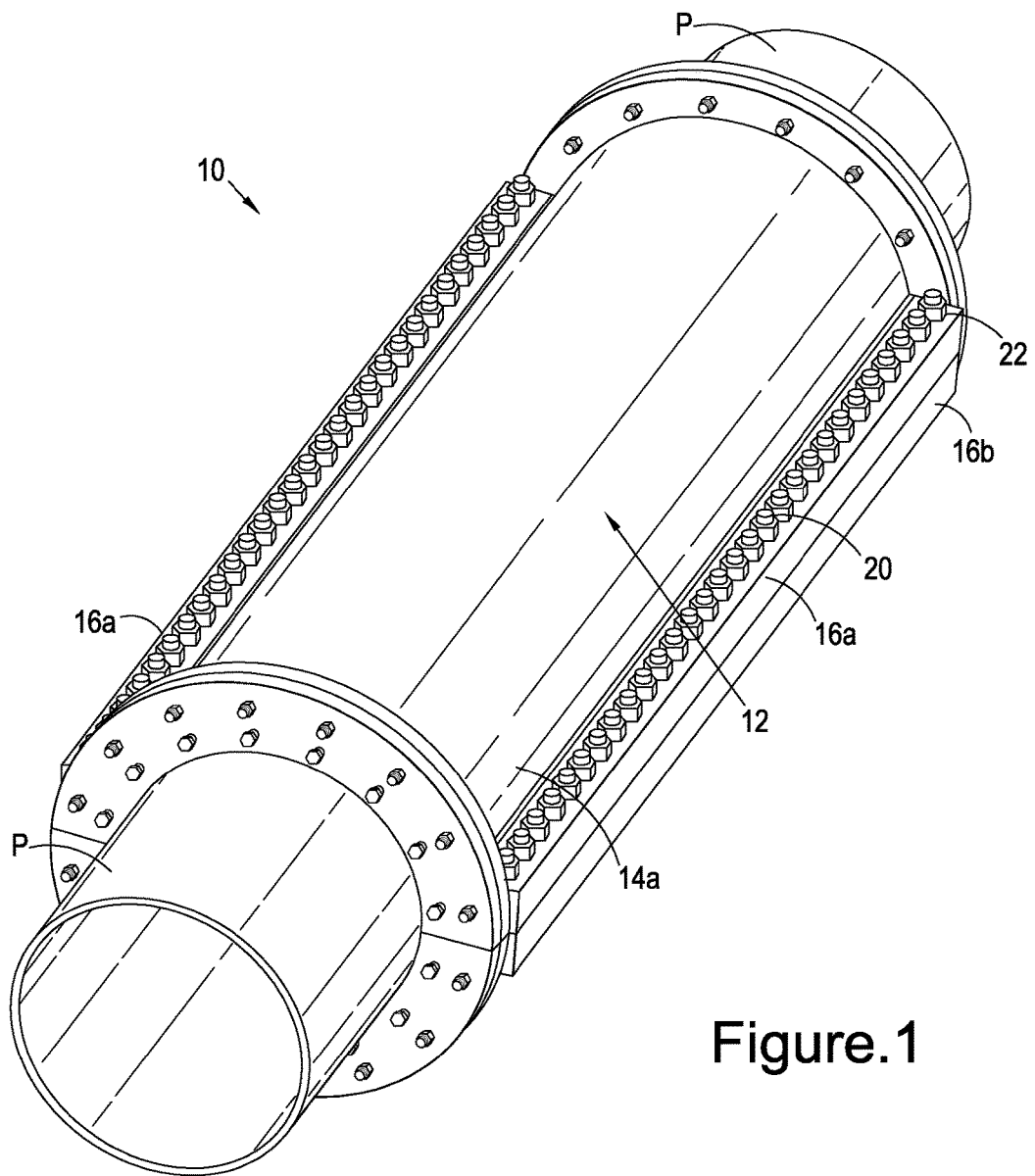
FIG. 1 shows a perspective view of a pipe sealing apparatus according to a first embodiment of the present invention.
Figure 2:
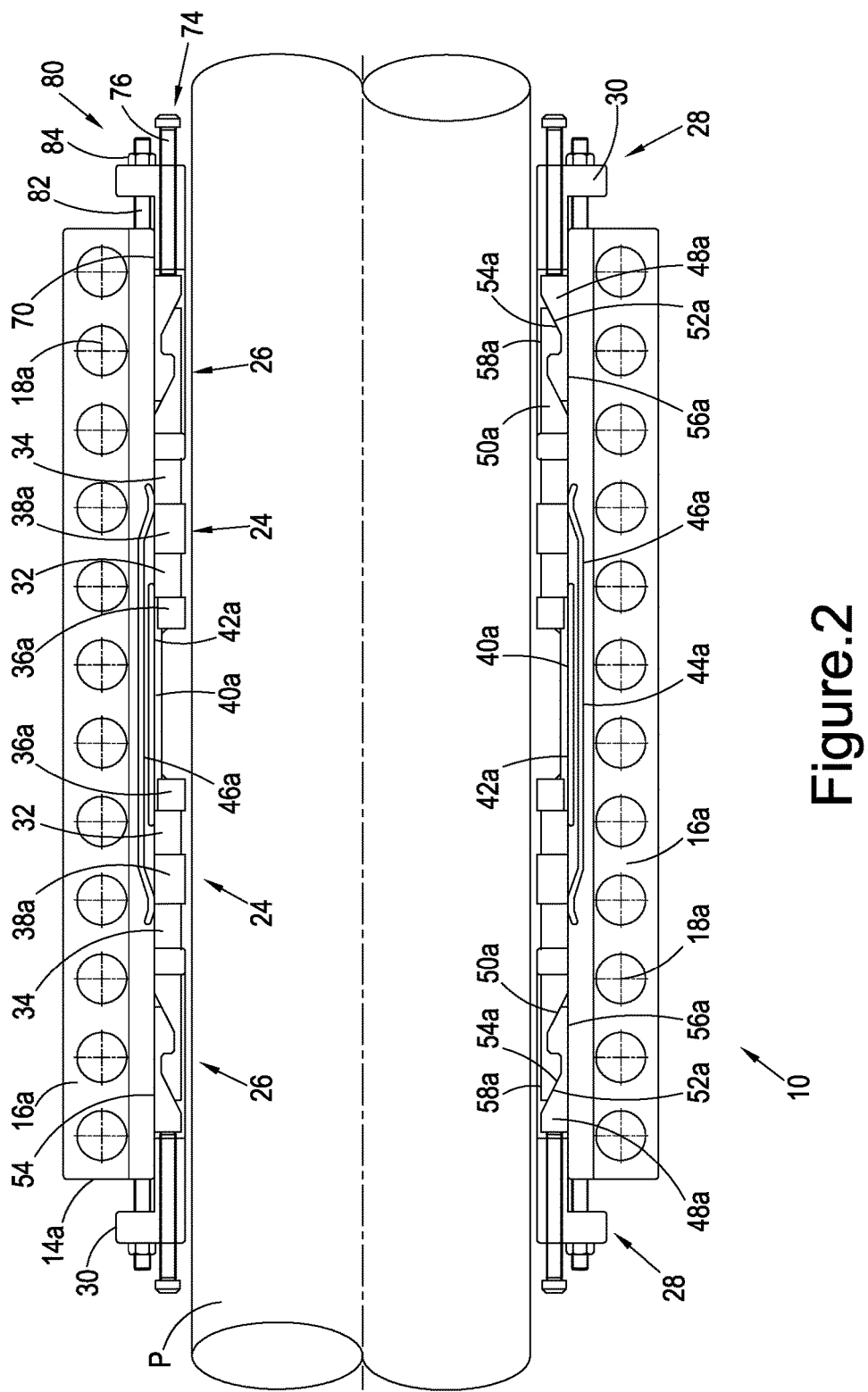
FIG. 2 shows a first body portion of the pipe sealing apparatus shown in FIG. 1, in a first configuration.
Figure 3:
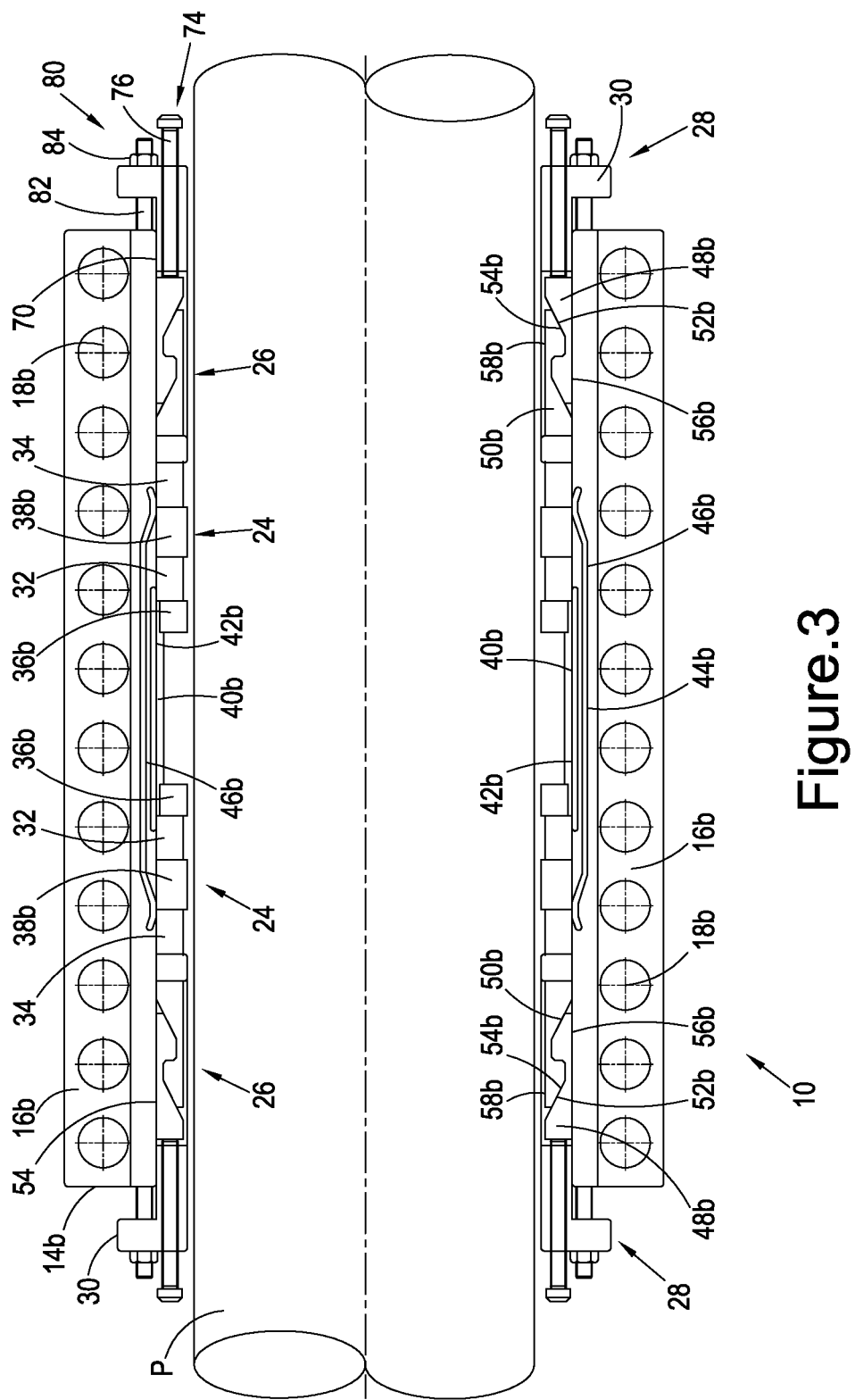
FIG. 3 shows a second body portion of the pipe sealing apparatus shown in FIGS. 1 and 2, in the first configuration.

Referring first to FIGS. 1, 2 and 3 of the accompanying drawings, there is shown a pipe sealing apparatus 10 according to a first embodiment of the present invention. As shown in FIG. 1, the apparatus 10 takes the form of a split sleeve clamp having a body 12 including a first body portion 14a (shown in FIGS. 1 and 2) and a separate second body portion 14b (shown in FIG. 3). In the illustrated embodiment, the first and second body portions 14a, 14b are c-shaped in cross-section.

The first body portion 14a includes axially extending flanges 16a, with bores 18a (shown in FIG. 2) for receiving bolts 20.

The second body portion 14b also includes axially extending flanges 16b with bores 18b (shown in FIG. 3) for receiving the bolts 20.

In use, the apparatus 10 is assembled onto the pipe P by arranging the body portions 14a, 14b about the pipe P with the flanges 16a, 16b in mating engagement, the body portions 14a, 14b then being clamped together by locating the bolts 20 through the bores 18a, 18b. The bolts 20 are secured by nuts 22.

As shown in FIGS. 2 and 3 of the accompanying drawings, the apparatus 10 includes a seal arrangement 24, a lock arrangement 26 and an actuation arrangement 28. In use, the actuation arrangement 28 actuates both the seal arrangement 24 and the lock arrangement 26 of the apparatus 10. Moreover, and as can be seen from FIGS. 2 and 3, the lock arrangement 26 is disposed on and carried by a lock member—in the illustrated embodiment in the form of a lock cage 30—of the actuation arrangement 28 and permits the seal arrangement 24 of the apparatus 10 to be actuated without the requirement to first activate the lock arrangement 26, as described in more detail below.

In the first embodiment, the lock arrangement 26, the actuation arrangement 28 and elements of the seal arrangement 24 are axially split to facilitate location of the apparatus 10 at any location along the pipe P. For ease of reference, like components are represented using like reference signs, with "a" added to designate components associated with the first body portion 14a and "b" added to designate components associated with the second body portion 14b.

As shown in FIG. 2, the seal arrangement 24 has two primary seal elements 32 and two secondary seal elements 34, each of the seal elements 32, 34 including compression seal elements. In use, the primary and secondary seal elements 32, 34 extend radially towards and into engagement with the pipe P when axially compressed by the actuation arrangement 28, as will be described below. The seal elements 32, 34 also extend radially outwards towards the body portions 14a, 14b when axially compressed by the lock cage 30 of the actuation arrangement 28 to seal on the body portions 14a, 14b.

The primary seal elements 32 abut respective end plates 36a coupled to the first body portion 14a. The secondary seal elements 34 are axially spaced from the primary seal elements 32, and spacers 38a are interposed between the primary seal elements 32 and the secondary seal elements 34.

Figure 7:
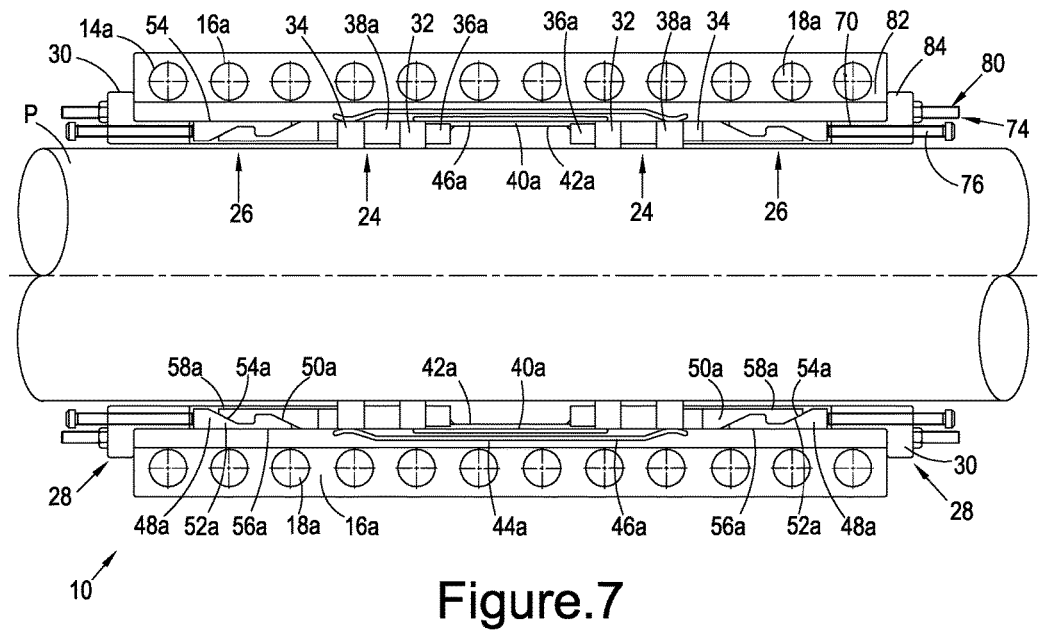
FIG. 7 shows the first body portion of the pipe sealing apparatus, in a second configuration.

In use, the primary seal elements 32, the secondary seal elements 34, and the spacers 38a are disposed in the first body portion 14a. Axial movement of the actuation arrangement 28 towards the seal arrangement 24 compresses the secondary seal elements 34 against the spacers 38a which in turn compresses the primary seal elements 32 against the end plates 36a. Axial compression of the seal elements 32, 34 causes the seal elements 32, 34 to extend radially to engage and seal against the outer surface of the pipe P (see FIG. 7) and against the body portions 14a, 14b.

In the illustrated embodiment, the seal arrangement 24 further includes two primary longitudinally arranged face seal elements 40a disposed in seal grooves 42a and two secondary longitudinally arranged face seal elements 44a disposed in seal grooves 46a. The primary face seal elements 40a extend between the primary compression seal elements 32. The secondary face seal elements 44a extend between the secondary compression seal elements 34.

In use, the face seal elements 40a, 44a provide primary and secondary face seals between the mating flanges 16a, 16b of the first body portion 14a and the second body portion 14b.

As described above, the second body portion 14b of the apparatus 10 is shown in FIG. 3 of the accompanying drawings, and the seal arrangement 24 in the second body portion 14b is the mirror image of that described above with respect to FIG. 2.

As shown in FIG. 3, the primary seal elements 32 abut respective end plates 36b coupled to the second body portion 14b. The secondary seal elements 34 are axially spaced from the primary seal elements 30b and spacers 38b are interposed between the primary seal elements 32 and the secondary seal elements 34.

Longitudinally arranged face seal elements may alternatively or additionally be disposed in the second body portion 14b, if required.

As described above, the seal arrangement 24 is actuated using an actuation arrangement 28 which also carries the lock arrangement 26 of the apparatus 10, and the lock arrangement 26 and actuation arrangement 28 according to the first embodiment will now be described in more detail with reference to FIGS. 2 and 3 and also FIGS. 4 and 5 of the accompanying drawings.

The lock arrangement 26 includes a taper lock arrangement having a plurality of lock bowl elements or segments 48a, 48b and a plurality of pipe-engaging lock elements or segments 50a, 50b. As with the seal arrangement 24, the lock arrangement 26 in this embodiment is axially split. The lock bowl segments 48a and lock segments 50a are disposed in the first body portion 14a, and the lock bowl segments 48b and lock segments are 50b disposed in the second body portion 14b.

As shown in FIG. 2, the lock bowl elements 48a each have a ramp profile 52a, while the lock segments 50a each have a ramp profile 54a. Similarly, as shown in FIG. 3, the lock bowl elements 48b each have a ramp profile 52b, while the lock segments 50b each have a ramp profile 54b. The ramp profiles 52a, 52b, 54a, 54b are configured, in use, such that axial movement of the lock bowl segments 48a, 48b urges the lock segments 50a, 50b radially inwards into engagement with the pipe P and urges the lock bowl segments 48a, 48b outwards. The lock bowl segments 48a, 48b are also provided with a surface profile, such as teeth 56a, 56b respectively, for gripping the body portions 14a, 14b. The lock segments 50a, 52b are also provided with a surface profile, such as teeth 58a, 58b respectively, for gripping the pipe P.

Figure 5:
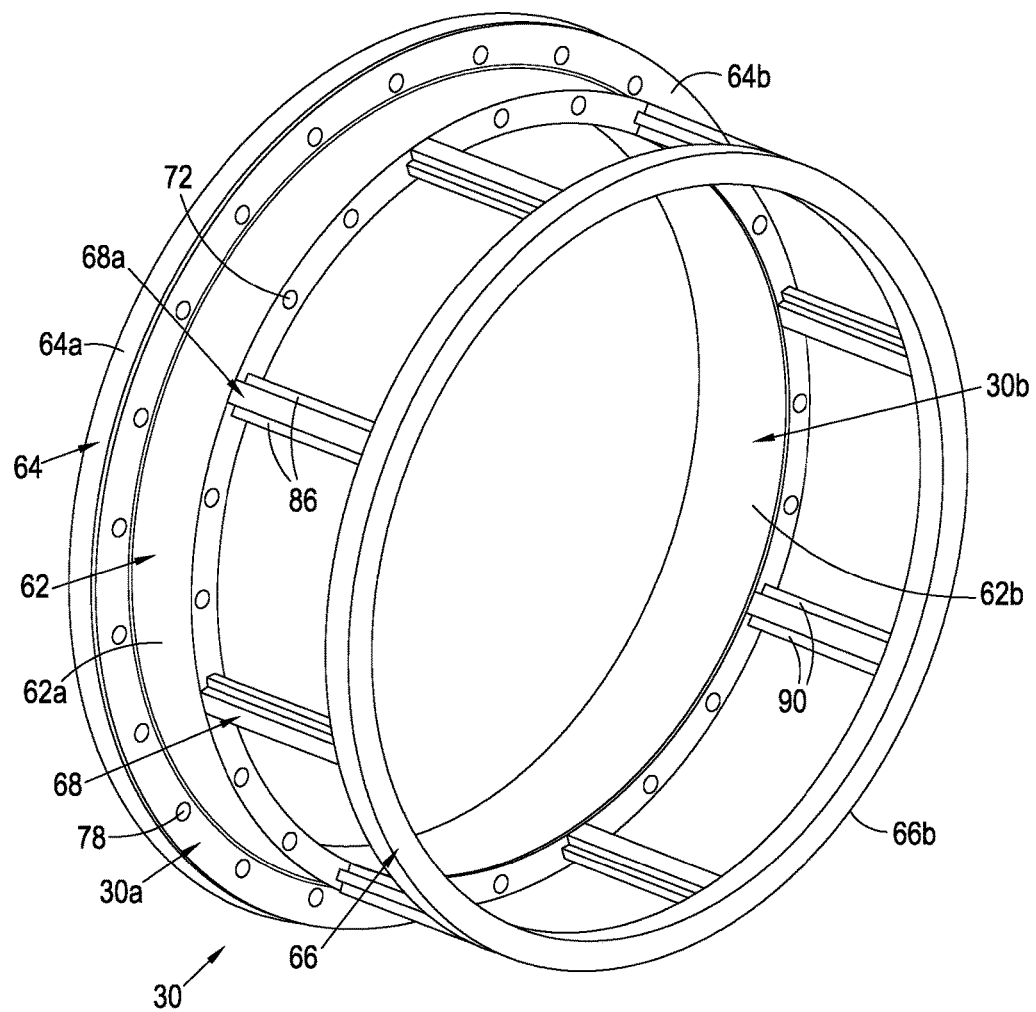
FIG. 5 shows a perspective view of a lock cage, in an assembled condition and with the lock arrangement of the apparatus removed for clarity.

As shown in the exploded view of the apparatus 10 shown in FIG. 5, the engaging lock bowl segments 48a, 48b and lock segments 50a, 50b are initially retained together, this being achieved in the illustrated embodiment by retainers in the form of shear screws 60. However, it will be understood that any suitable retainer may be used, such as a slot and spring retention mechanism or the like. Beneficially, the shear screws 60 prevent premature activation of the lock arrangement 26, the shear screws 59 shearing in response to an axial load applied to the lock bowl segments 48a, 48b reaching a given threshold value.

As described above, the lock arrangement 26 is disposed on and carried by a lock cage 30 of the actuation arrangement 28 and permits the seal arrangement 24 of the apparatus 10 to be actuated without the requirement to first activate the lock arrangement 26. In the illustrated embodiment, the actuation arrangement 28 of the apparatus 10 includes two lock cages 30, with one lock cage 30 disposed at each end of the apparatus 10 and, in use, the lock cages 30 are disposed between the body 12 and the pipe P such that axial movement of the lock cages 30 towards the seal arrangement 24 urges the seal arrangement 24 into engagement with the pipe P.

Figure 4:
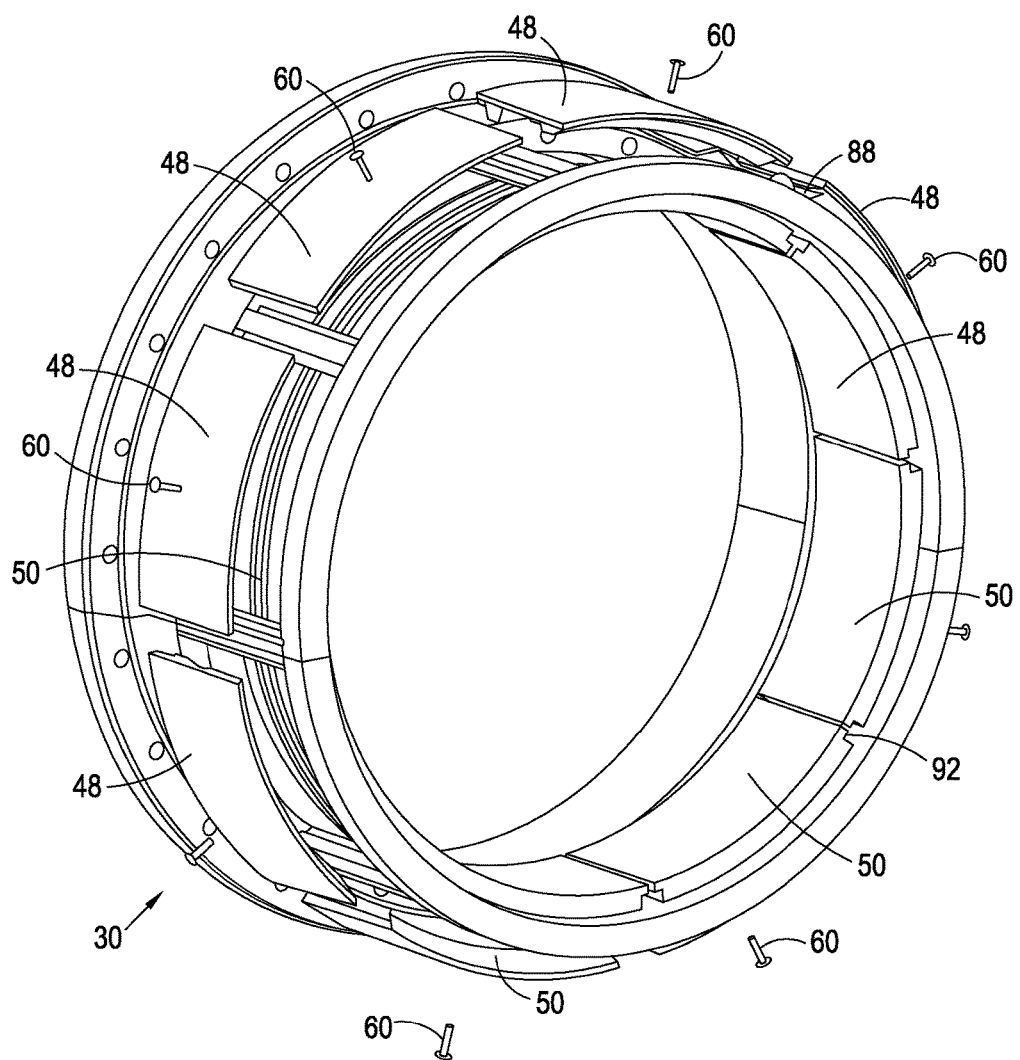
FIG. 4 shows an exploded perspective view of the lock cage and the lock arrangement.

Referring now in particular to FIGS. 4 and 5 of the accompanying drawings, the lock cages 30 each include a body 62, a flange plate 64 and an end plate 66. The end plate 66 is coupled to the body 62 by a number of struts 68. In this first embodiment, each of the lock cages 30 is axially split such that each of the body 62, the flange plate 64 and the end plate 66 are constructed as two separate components: a first body portion 62a, a first flange plate portion 64a, a first end plate portion 66a and a number of the struts 68 together forming a first generally semi-cylindrical lock cage portion 30a for location in the first body portion 14a of the apparatus 10, and also a second body portion 62b, a second flange plate portion 64b, a second end plate portion 66b and the remaining struts 68 together forming a second generally semi-cylindrical lock cage portion 30b for location in the second body portion 14b of the apparatus 10.

The body 62 of each lock cage 30 is configured for location between the outside of the pipe P and the inside bore 70 of the body portions 14a, 14b of the apparatus 10. As shown most clearly in FIG. 4, axially extending bores 72 are provided through the body 62 of the lock cage 30, the bores 72 providing mounting for a lock activation arrangement 74 of the apparatus 10. The lock activation arrangement 74 may take a number of different forms. However, in the illustrated embodiment, the lock activation arrangement 74 includes screws 76 which are disposed through the bores 72 and which act on the lock arrangement 26, in particular urging the lock bowl segments 48a, 48b relative to the lock segments 50a, 50b in order to urge the lock segments 50a, 50b radially into engagement with the pipe P and the lock bowl segments 48a, 48b radially out to bore 70.

As with the body 62, the end plate 66 of each lock cage 30 is configured for location between the outside of the pipe P and the inside of the body portions 14a, 14b of the apparatus 10 and, in use, forms a compression plate of the lock cage 30 which engages the seal arrangement 24. Axial movement of the lock cage 30 urges the seal arrangement 24 into engagement with the pipe P.

In order to facilitate such axial movement of the lock cage 30, the flange plate 64 of each lock cage 30 extends to a greater radial extent than the body 62 and is provided with axially extending bores 78 therethrough, the bores 78 providing mounting for a seal activation arrangement 80 of the apparatus 10. The seal activation arrangement 80 may take a number of different forms. However, in the illustrated embodiment, the seal activation arrangement 80 includes a plurality of bolts 82 disposed through the bores 78, each bolt 82 being secured with a nut 84 to couple the flange plate 64—and thus the lock cage 30—to the body portions 14a, 14b. In use, application of torque to the nuts 84 urges the flange plate 64—and thus the lock cage 30—towards the seal arrangement 24 to urge the seal arrangement 24 into engagement with the pipe P; this being achieved as a distinct operation from activation of the lock arrangement 26.

As shown most clearly in FIG. 4, the struts 68 are disposed between the body 62 and the end plate 66 and provide mounting for the lock arrangement 26 of the apparatus 10. The struts 68 may take a number of different forms, and in some embodiments, the struts 68 may be of circular cross section. However, in the illustrated embodiment, the struts 68 are cross-shaped in cross section, each strut 68 having shoulders 86 on their outer surface for engaging corresponding undercut sections 88 on the lock bowl segments 45 and shoulders 90 on their inner surface for engaging corresponding undercut sections 92 on the lock segments 48.

Figure 6:
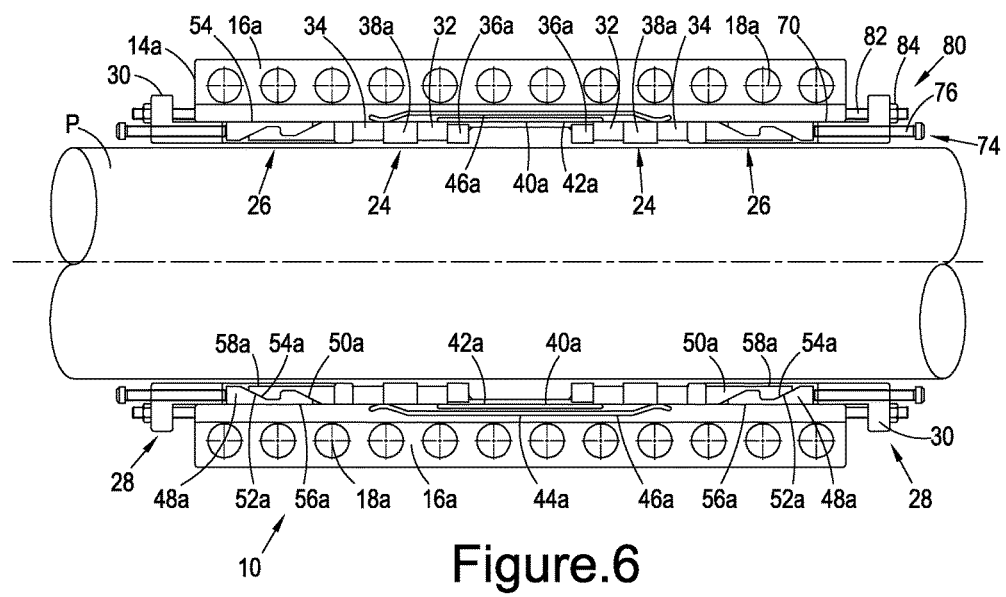
FIG. 6 shows the first body portion of the pipe sealing apparatus, in the first configuration.
Figure 6A:
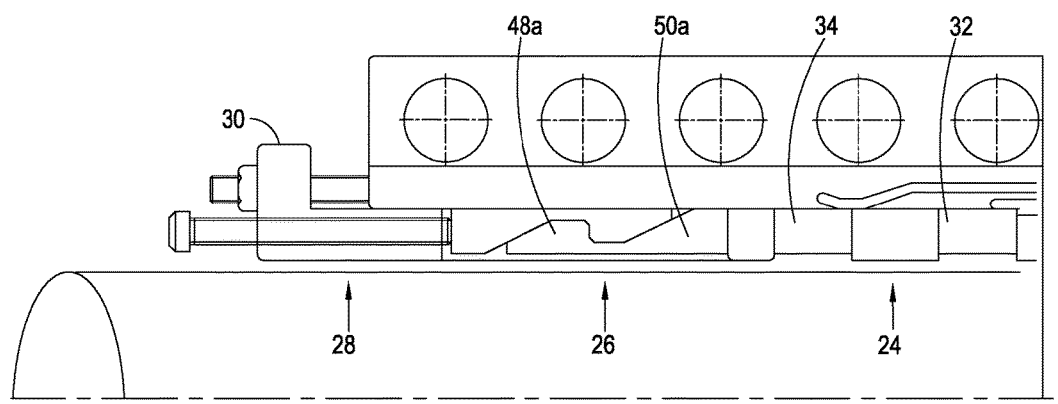
FIG. 6A shows an enlarged view of part of the pipe sealing apparatus shown in FIG. 6.
Figure 7A:
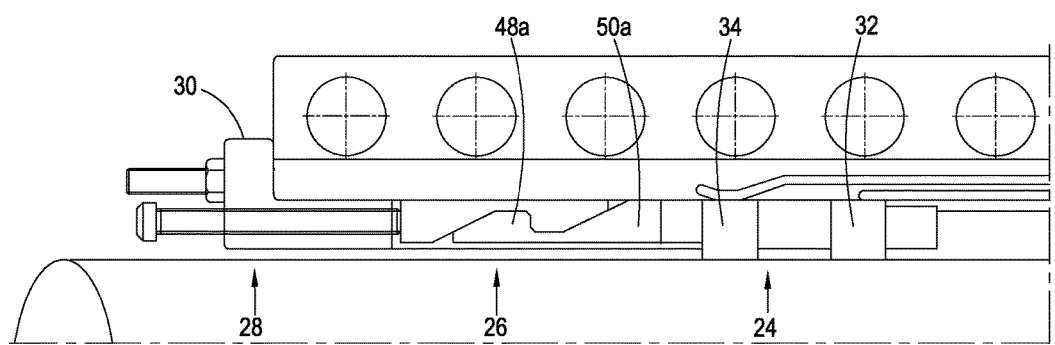
FIG. 7A shows an enlarged view of part of the pipe sealing apparatus shown in FIG. 7.
Figure 8:
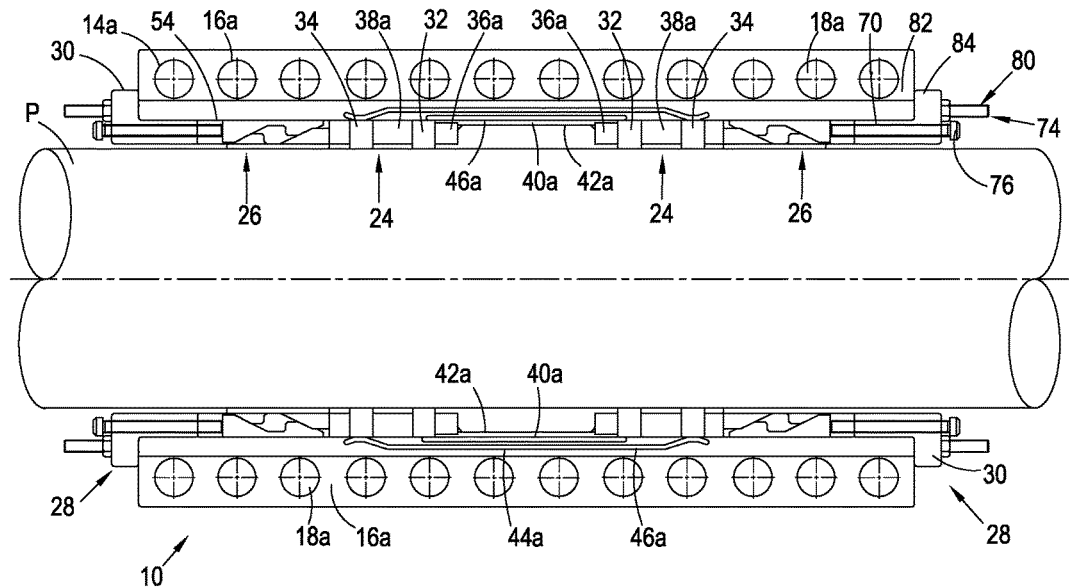
FIG. 8 shows the first body portion of the pipe sealing apparatus, in a third configuration.
Figure 8A:
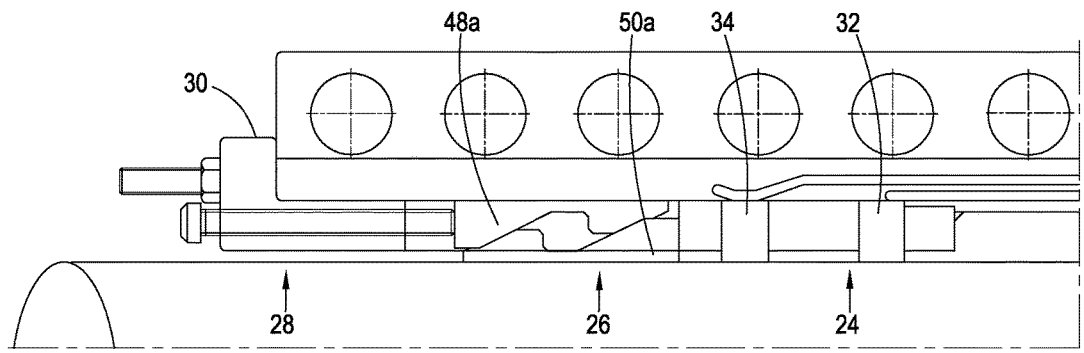
FIG. 8A shows an enlarged view of part of the pipe sealing apparatus shown in FIG. 8.

Operation of the apparatus 10 will now be described with reference to FIGS. 1 to 5 and also now with reference to FIGS. 6 to 8A, of which FIGS. 6A, 7A and 8A show enlarged views of the seal arrangement 24, the lock arrangement 26 and the actuation arrangement 28 of the apparatus 10.

Prior to location of the apparatus 10 around the pipe P, the lock cage portions 30a, 30b are first pre-loaded with the lock bowl segments 48a, 48b and the lock segments 50a, 50b of the lock arrangement 26. The shoulders 86 on the outer surface of the struts 68 engage the undercut sections 88 of the lock bowl segments 48a, 48b, and the shoulders 90 on the inner surface of the struts 68 engage the undercut sections 92 of the lock segments 50a, 50b. In the illustrated embodiment, one lock bowl segment 48a,48b and one lock segment 50a, 50b are sandwiched between each pair of struts 68.

The lock cage portions 30a, 30b are then assembled into the body portions 14a, 14b of the apparatus 10 along with the compression seal elements 32a, 32b, 34a, 34b, a small tensile load being applied to the compression seals 32a, 32b, 34a, 34b to retain these in place.

The assembled apparatus 10 is then mounted on the pipe P by arranging the first and second body portions 14a, 14b about the pipe P with the flanges 16a, 16b in mating engagement, the first and second body portions 14a, 14b then being clamped together by the bolts 20 and nuts 22.

Activation of the compression seal elements 32a, 32b, 34a, 34b is then performed by application of torque to the nuts 84 to urge the flange plate 64—and thus the lock cages 30—towards the seal arrangement 24 to urge the seal arrangement 24 into engagement with the pipe P. This is achieved as a distinct operation from activation of the lock arrangement 26.

If, as in the illustrated embodiment, the apparatus 10 is provided with a dual seal arrangement having primary and secondary compression seal elements 32a, 32b, 34a, 34b, the seal integrity can be verified with an annulus test prior to activating the lock arrangement 26.

When the seal arrangement 24 is fully compressed and verified, the lock arrangement 28 can be activated by application of axial load to the lock bowl segments 48a, 48b by application of torque to the screws 76.

The application of axial load is initially resisted by the shear screws 60 which prevent premature activation of the lock arrangement 26. However, where the applied axial load on the lock bowl segments 48a, 48b exceeds a given threshold, the shear screws 60 will shear, permitting axial movement of the lock bowl segments 48a, 48b relative to the lock segments 50a, 50b under a relatively low axial load (by continued application of torque to the screws 76. This causes the lock bowl segments 48a, 48b to stroke forward and driving the lock segments 50a, 50b radially inward onto the pipe P and driving the lock bowl segments 48a, 48b into engagement or tighter engagement with the first and second body portions 14a, 14b).

Once the lock arrangement 26 is fully engaged, a bedding load can be applied via the actuation arrangement 28 in the form of a relatively high torque to provide a fixed restraint, following which seal pressure will be maintained even if the axial load applied by the seal activation arrangement 24 is released, because the end plates 66 will be trapped by the lock arrangement 26. In this configuration, an actuation load is also maintained on the lock arrangement 26 because the forces generated by pressure will act to maintain the lock.

During operation, internal pressure inside the apparatus 10 will be encapsulated by the primary seal elements 32, minimizing the separation load. The axial load acting on the seals 32 will also be limited to the seal cross sectional area. The axial load from the pipe cross sectional area will pass through the locks, the taper interface, and lock bowl 48a, 48b into the body portions 14a, 14b while none of the axial load will pass the locks onto the flange plates 64, permitting the seal actuation load to be released if desired.

Where required, the apparatus 10 can be removed by releasing the transverse bolts 22.

Referring now to FIGS. 9 to 14A of the accompanying drawings, there is shown a pipe sealing apparatus 110 according to a second embodiment of the present invention. The pipe sealing apparatus 110 is similar to the apparatus 10 described above and like components are represented by like numerals incremented by 100.

Figure 9:
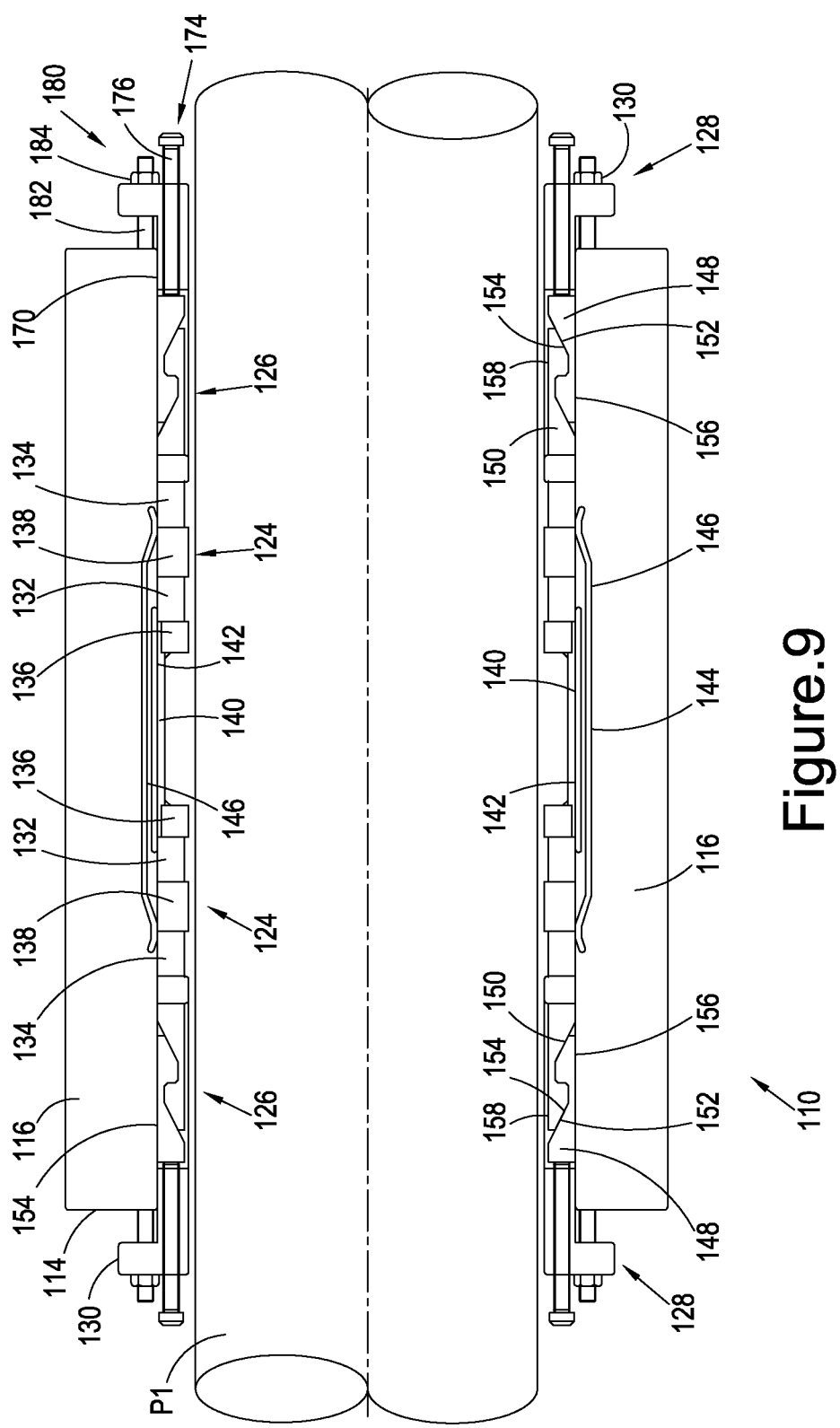
FIG. 9 shows a longitudinal cutaway view of a pipe sealing apparatus according to a second embodiment of the invention, in a first configuration.

FIG. 9 shows a longitudinal cutaway view of the pipe sealing apparatus 110 in a first configuration. As shown in FIG. 9, the apparatus 110 takes the form of a pipe connector having a connector body 112 into which sections of pipe P1, P2 are located, the apparatus 110 being used to connect the pipe sections P1, P2 together. In contrast to the body 12 of the apparatus 10, the body 112 of apparatus 110 includes a unitary construction.

Figure 10:
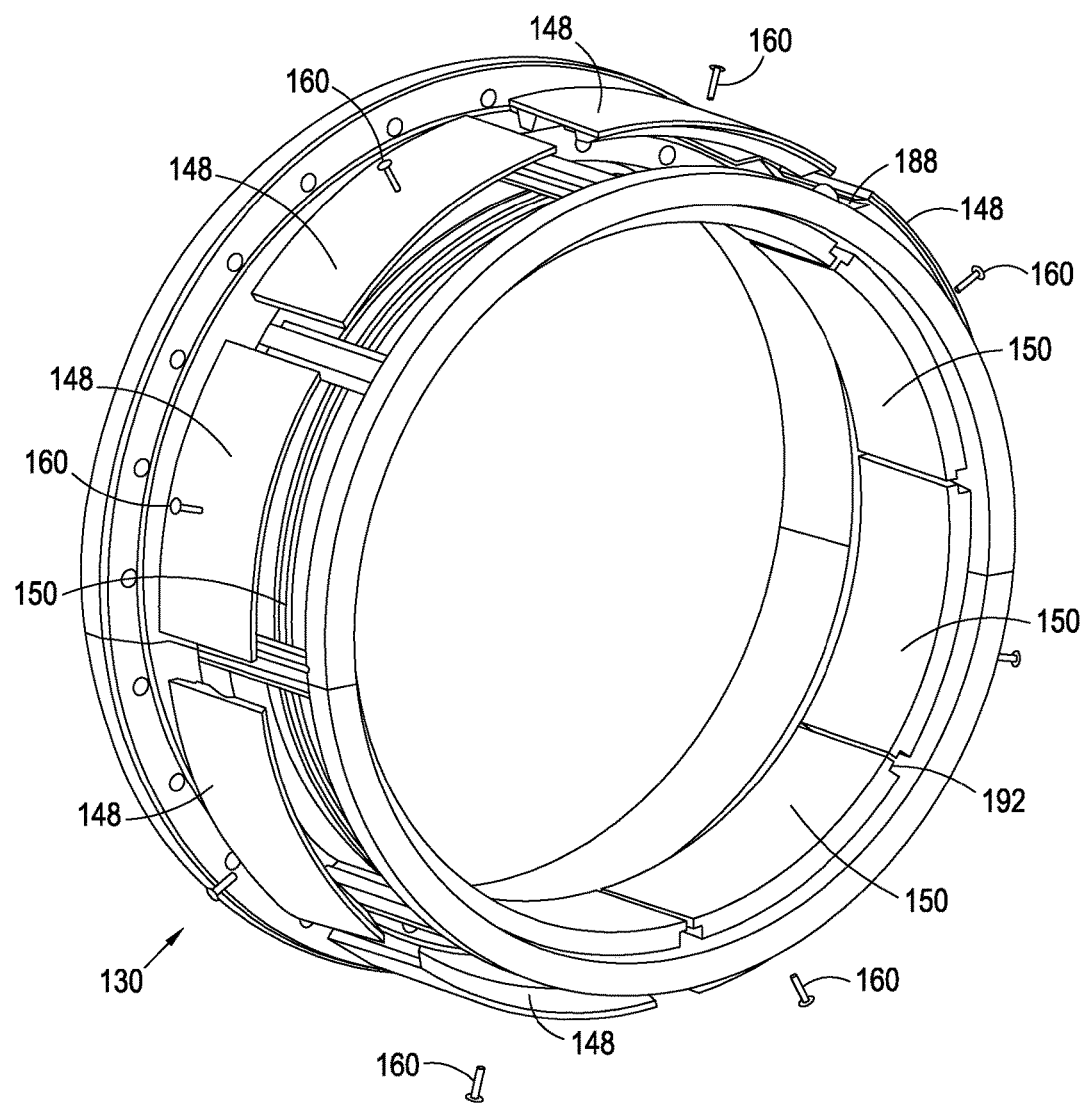
FIG. 10 shows an exploded perspective view of the lock cage and the lock arrangement.

Referring now also to FIG. 10 of the accompanying drawings which shows a longitudinal section view of the apparatus 10 in a first configuration, the apparatus 110 includes a seal arrangement 124, a lock arrangement 126 and an actuation arrangement 128 configured to both actuate the seal arrangement 124 and activate the lock arrangement 126. The lock arrangement 126 is carried by the actuation arrangement 128 to permit the seal arrangement 126 to be actuated without the requirement to first activate the lock arrangement 126.

As shown in FIG. 10, the seal arrangement 124 in this embodiment has two primary seal elements 132 and two secondary seal elements 134, each of the seal elements 132, 134 including compression seal elements which, in use, extend radially towards and into engagement with the pipe sections P1, P2 when axially compressed by the actuation arrangement 128. As shown in FIG. 9, the primary seal elements 132 abut respective end plates 136 coupled to the body 112. The secondary seal elements 134 are axially spaced from the primary seal elements 132 and spacers 138 are interposed between the primary seal elements 132 and the secondary seal elements 134.

In use, the primary seal elements 132, the secondary seal elements 134, and the spacers 138 are disposed in the body 112, and axial movement of the actuation arrangement 128 towards the seal arrangement 124 compresses the secondary seal elements 134 against the spacers 138, which in turn compresses the primary seal elements 132 against the end plates 136. Axial compression of the seal elements 132, 134 causes the seal elements 132, 134 to extend radially to engage and seal against the outer surface of the pipe sections P1, P2 and against the body 112 (see FIGS. 13 and 13A).

As described above, the seal arrangement 124 is actuated using an actuation arrangement 128 which also carries the lock arrangement 126 of the apparatus 110. The lock arrangement 126 and the actuation arrangement 128 according to the second embodiment will now be described in more detail with reference to FIG. 10, and also FIGS. 11 and 12 of the accompanying drawings.

The lock arrangement 126 in the illustrated embodiment includes a taper lock arrangement having a plurality of lock bowls segments 148 each having a ramp profile 152 and a plurality of lock segments 150 also each having a ramp profile 154. The ramp profiles 152 of each lock bowl segment 148 are configured, in use, such that axial movement of the lock bowl segments 148 urges the lock segments 150 into engagement with the pipe sections P1, P2 and the lock bowls segments 148 radially out to a bore 170.

In particular embodiments, and as shown in the exploded view of the apparatus 110 shown in FIG. 10, the lock arrangement 126 is configured so that the engaging lock bowl segments 148 and the lock segments 150 are initially retained together, this being achieved in the illustrated embodiment by retainers in the form of shear screws 160. However, it will be understood that any suitable retainer may be used, such as a slot and spring retention mechanism or the like. Beneficially, the shear screws 160 prevent premature activation of the lock arrangement 126, and the shear screws 160 shear in response to an axial load applied to the lock bowl segments 148 reaching a given threshold value. The lock bowl segments 148 and the lock segments 150 are also provided with a surface profile, such as teeth 156 and 158, respectively, for gripping the body 112 and the pipe sections P1, P2.

The actuation arrangement 128 of the apparatus 110 includes two lock cages 130, with one lock cage 130 disposed at each end of the apparatus 110 and, in use, the lock cages 130 are disposed between the body 112 and the pipe sections P1, P2 such that axial movement of the lock cages 130 towards the seal arrangement 124 urges the seal arrangement 124 into engagement with the pipe sections P1, P2.

Figure 11:
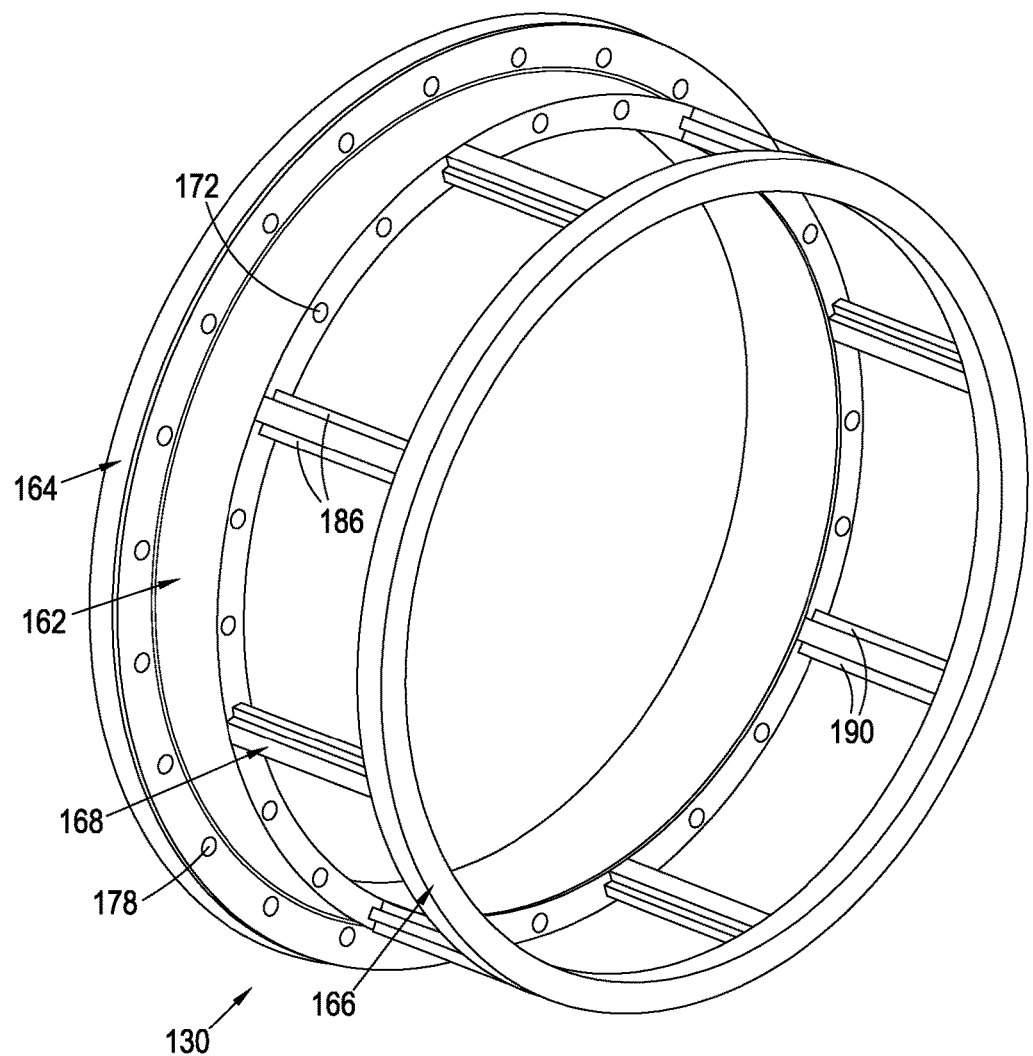
FIG. 11 shows a perspective view of a lock cage, in an assembled condition and with the lock arrangement of the apparatus removed for clarity.

Referring now in particular to FIGS. 10 and 11 of the accompanying drawings, the lock cages 130 each include a body 162, a flange plate 164 and an end plate 166. The end plate 166 is coupled to the body 160 by a number of struts 168. In this second embodiment, the lock cages 130 have a unitary construction, and the body 162, the flange plate 164, the end plate 166 and the struts 168 are a single piece construction. As shown for example in FIGS. 10 and 11, the body 162 of each lock cage 130 is configured for location between the outside of the pipe sections P1, P2 and the inside of the body 112 of the apparatus 110. As in the apparatus 10, in the apparatus 110, axially extending bores 172 are provided through the body 162 of the lock cage 130. The bores 172 provide mounting for a lock activation arrangement 174 of the apparatus 110. The lock activation arrangement 174 may take a number of different forms. However, in the illustrated embodiment, the lock activation arrangement 174 includes screws 176 which are disposed through the bores 172 and which act on the lock arrangement 126, in particular urging the lock bowl segments 148 relative to the lock segments 150 in order to urge the lock segments 150 radially into engagement with the pipe sections P1, P2.

As with the body 162, the end plate 166 of each lock cage 130 is also configured for location between the outside of the pipe sections P1, P2 and the inside of the body 112 of the apparatus 110 and, in use, forms a compression plate of the lock cage 130 which engages the seal arrangement 124. Axial movement of the lock cage 130 urges the seal arrangement 124 into engagement with the pipe sections P1, P2.

In order to facilitate such axial movement of the lock cage 130, the flange plate 164 of each lock cage 130 extends to a greater radial extent than the body 162 and is provided with axially extending bores 178 therethrough, the bores 178 providing mounting for a seal activation arrangement 180 of the apparatus 110. The seal activation arrangement 180 may take a number of different forms. However, in the illustrated embodiment, the seal activation arrangement 180 includes a plurality of bolts 182 disposed through the bores 178, each bolt 182 being secured with a nut 184 to couple the flange plate 164—and thus the lock cage 130—to the body 112. In use, torqueing the nuts 184 urges the flange plate 164—and thus the lock cage 130—towards the seal arrangement 124 to urge the seal arrangement 124 into engagement with the pipe sections P1, P2. This is achieved as a distinct operation from activation of the lock arrangement 126 as in the first embodiment.

The struts 168 are disposed between the body 162 and the end plate 166 and provide mounting for the lock arrangement 126 of the apparatus 110. The struts 168 may take a number of different forms and in some embodiments, the struts 168 may be of circular cross section. However, in the illustrated embodiment, the struts 168 are cross-shaped in cross section, each strut 168 having shoulders 186 on their outer surface for engaging corresponding undercut sections 188 on the lock bowl segments 148 and shoulders 190 on their inner surface for engaging corresponding undercut sections 192 on the lock segments 150.

Figure 12:
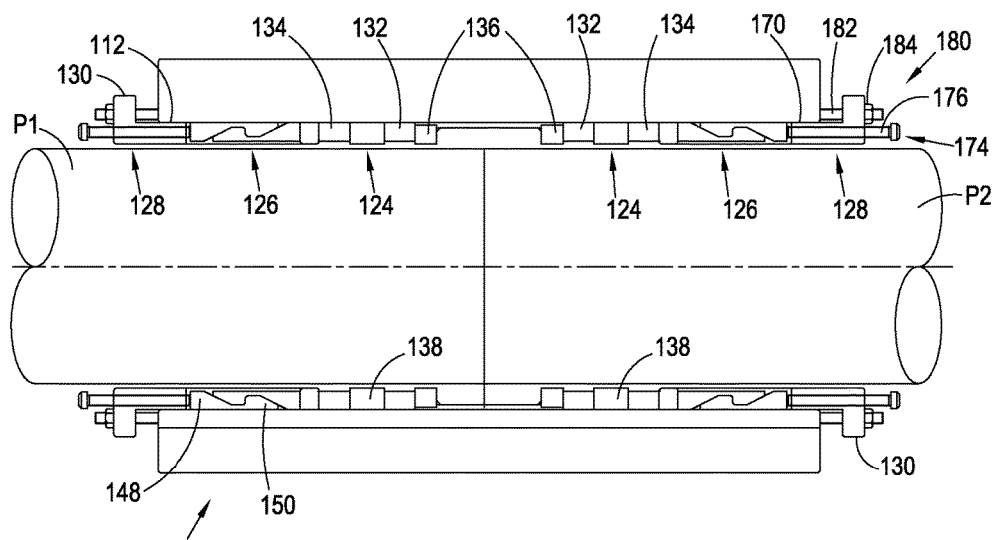
FIG. 12 shows a longitudinal cutaway view of the apparatus shown in FIG. 9, in the first configuration.
Figure 12A:
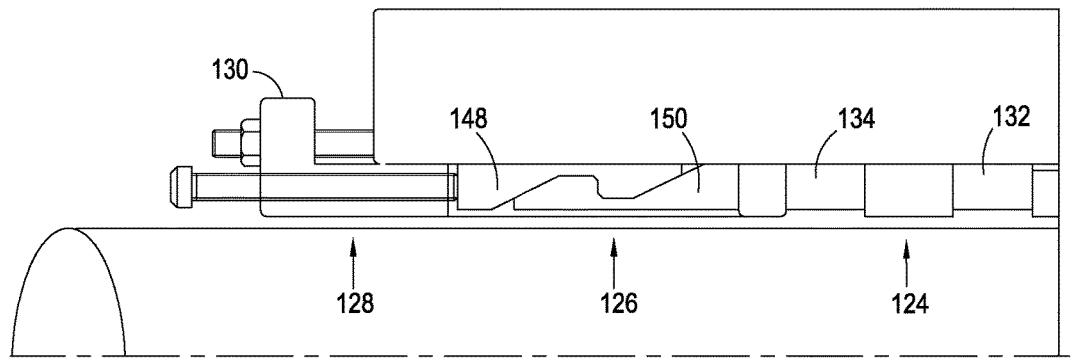
FIG. 12A shows an enlarged view of part of the pipe sealing apparatus shown in FIG. 12.
Figure 13:
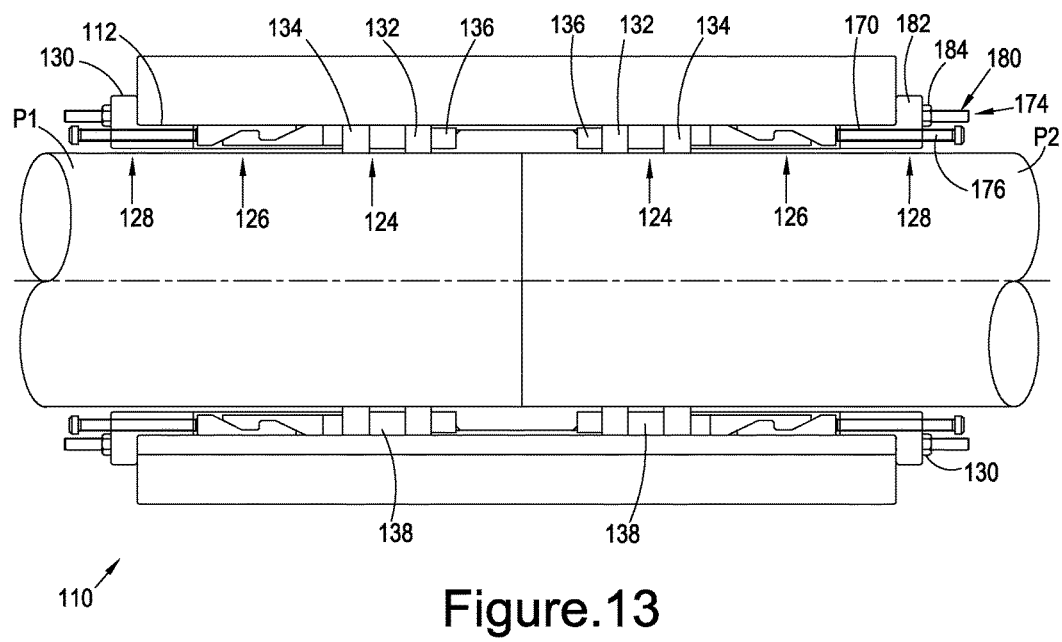
FIG. 13 shows a longitudinal cutaway view of the pipe sealing apparatus of FIG. 9, in a second configuration.
Figure 13A:
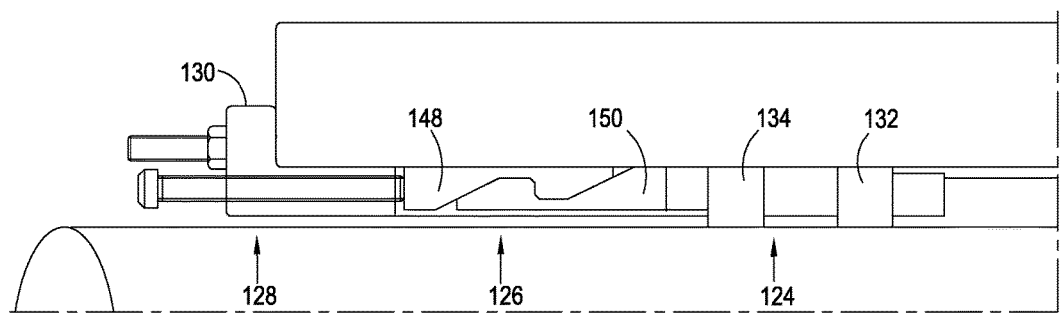
FIG. 13A shows an enlarged view of part of the pipe sealing apparatus shown in FIG. 13.
Figure 14:
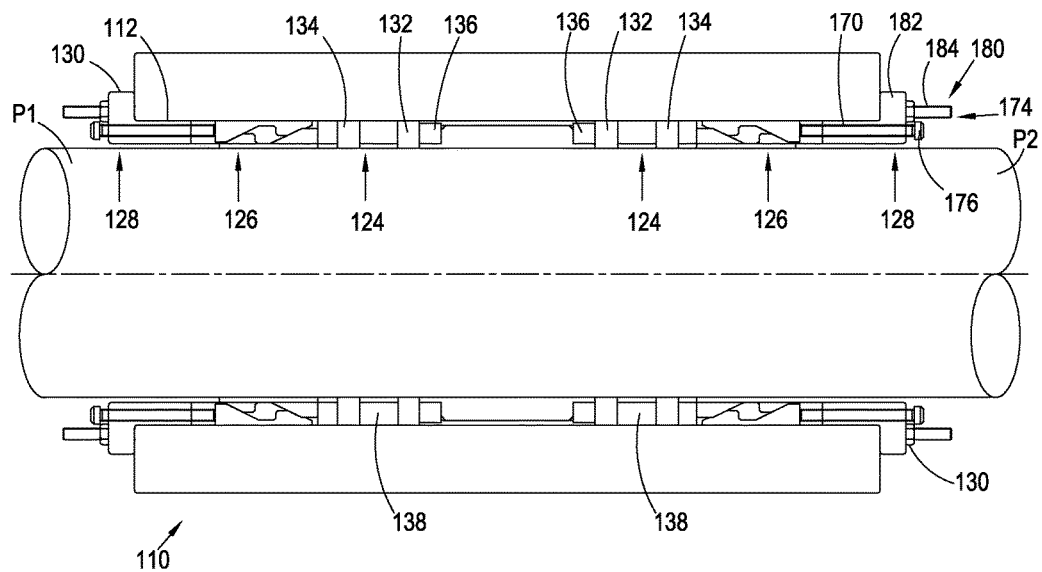
FIG. 14 shows a longitudinal cut-away view of the apparatus shown in FIG. 9, in a third configuration.
Figure 14A:
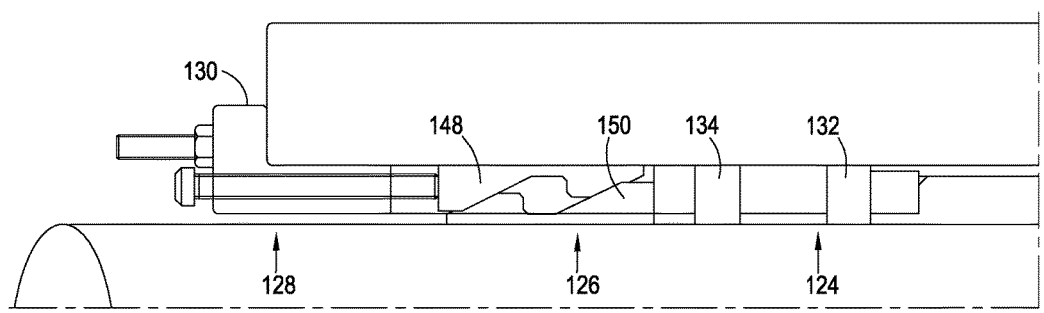
FIG. 14A shows an enlarged view of part of the pipe sealing apparatus shown in FIG. 14.

Operation of the apparatus 110 is similar to the apparatus 10 and will be described with reference to FIGS. 12 to 14A, of which FIGS. 12A, 13A and 14A show enlarged views of part of the apparatus 110.

Prior to location of the apparatus 10 around the pipe P, the lock cages 130 are first pre-loaded with the lock bowl segments 148 and the lock segments 150 of the lock arrangement 126. The shoulders 186 on the outer surface of the struts 168 engage the undercut sections 188 of the lock bowl segments 148. The shoulders 190 on the inner surface of the struts 168 engage the undercut sections 192 of the lock segments 150, and in the illustrated embodiment, one lock bowl segment 148 and one lock segment 150 are sandwiched between each pair of struts 168.

The compression seal elements 132, 134 are then installed in the body 112, and a small tensile load applied to retain the seal elements 132, 134 in place. The assembled apparatus 110 is then mounted and slid onto the pipe sections P1, P2.

Activation of the compression seal elements 132, 134 is then performed by application of torque to the nuts 184 to urge the flange plates 164—and thus the lock cages 130—towards the seal arrangement 124 to urge the seal arrangement 124 into engagement with the pipe sections P1, P2. This is achieved as a distinct operation from activation of the lock arrangement 126 as in the first embodiment.

If, as in the illustrated embodiment, the apparatus 110 is provided with a dual seal arrangement having primary and second compression seal elements 132, 134, the seal integrity can be verified with an annulus test prior to activating the lock arrangement 126.

When the seal arrangement 124 is fully compressed and verified, the lock arrangement 128 can be activated by application of axial load to the lock bowl segments 148 by application of torque to the screws 176.

As in the first embodiment, the application of axial load is initially resisted by the shear screws 160, which prevent premature activation of the lock arrangement 126. However, where the applied axial load on the lock bowl segments 148 exceeds a given threshold, the shear screws 160 will shear, permitting axial movement of the lock bowl segments 148 relative to the lock segments 150 under a relatively low axial load (by continued application of torque to the screws 176, causing the lock bowl segments 148 to stroke forward and thereby driving the lock segments 150 radially inward onto the pipe sections P1, P2 and driving the lock bowl segments 148 outwards into engagement or tighter engagement with the body 112).

Once the lock arrangement 126 is fully engaged, a bedding load can be applied as described above.

During operation, internal pressure inside the apparatus 110 will be encapsulated by the primary seal elements, minimizing the separation load. The axial load acting on the seals will also be limited to the seal cross sectional area. The axial load from the pipe cross sectional area will pass through the locks, the taper interface, and the lock bowl into the body 112, while none of the axial load will pass the locks onto the flange plate, permitting the seal actuation load to be released if desired.

The self-locking feature would make a connector trapped, which could be a problem to remove the connector post F.A.T. However, in embodiments of the invention, this is resolved by adding a tensile connection to the lock bowl. Before the lock bowl can be retracted, the self-locking load needs to be relieved. Increasing the load on the seal with the outer compression bolts will take the load off the lock grip and allow the lock bowl to be retrieved. Once the seal axial load is released, the lock bowl can be retraced so allowing the connector to be removed.

It will be recognized that embodiments of the present invention thus provide a number of advantages over conventional equipment and techniques, and at all stages of operation.

For example, during assembly, the ability to carry the lock arrangement on the lock cage permits the lock bowl segments and lock segments to be safely retained and in any orientation.

In use, embodiments of the present invention provide a mechanism for compressing the seals without lock activation and provides a mechanism for activating the locks independently after the seals are compressed. Separate lock activation provides assured knowledge of lock stroke and verifies full activation. Embodiments of the present invention also provide an arrangement whereby full seal compression can be maintained even if the seal activation load is removed.

Embodiments of the present invention can also accommodate significant radial clearance and pipe tolerance, since variation in lock stroke from different pipe dimensions and tolerances does not affect seal position, resulting in an apparatus which can respond to wide tolerances in pipe outer diameter.

During operation, the radial load generated from the pipe axial load acting on the taper lock is supported by the pipeline internal pressure, minimizing the required lock contact area. In addition, the lock bowl load is separate from the internal pressure, with the effect that external radial is evenly distributed, AND this particularly relevant for bolted split sleeve clamps applications which traditionally suffer from uneven application of loads.

Face seals no longer have to encapsulate the locks. This effectively moves in the bolt moment in the side bolts so reducing clamp weight and cost.

Since the lock arrangement is not exposed to fluid in the pipe/pipe sections, the lock arrangement need not be compliant to pipeline media chemistry.

Seal compression activation can be used to safely release load on locks to facilitate connector removal, required for F.A.T.

Embodiments of the present invention also allow significant weight reductions in the pipeline fittings. This has a cost and delivery benefit as well as a reduction of weight on the pipeline.

This design allows simple hydraulic rams to be used to set the apparatus. After lock actuation, the seals will maintain lock grip, and the locks will retain the seal pressure, making the fitting self-energized.

In clamp applications, the rigid support provided by the length of the lock cages enclosed inside the body portions also greatly reduces the tendency for the flange plate to separate under load.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An actuation arrangement for a pipe sealing apparatus, the actuation arrangement comprising:
   an actuation member configured for location about a section of a pipe, the actuation member operatively associated with a seal arrangement of the pipe sealing apparatus such that axial movement of the actuation member towards the seal arrangement urges the seal arrangement into engagement with the pipe, wherein the actuation member comprises a body portion configured for location about the pipe and between outside of the pipe and the pipe sealing apparatus, a flange portion, and end portion, and at least one strut disposed between the body portion and the end portion; and
   a lock arrangement configured to secure the pipe sealing apparatus to the pipe, wherein the lock arrangement is disposed on the actuation member.

2. The actuation arrangement of claim 1, wherein the seal arrangement and the lock arrangement are activated independently.

3. The actuation arrangement of claim 1, wherein the lock arrangement is located outside a pressure boundary provided by the actuated seal arrangement.

4. The actuation arrangement of claim 1, wherein the actuation member is moveably coupled to the pipe sealing apparatus, and the actuation member is moveable between a first position distal to, or spaced from, an end of the pipe sealing apparatus and a second position proximal to the pipe sealing apparatus.

5. The actuation arrangement of claim 1, wherein one of:
   the actuation member is configured to permit axial movement of the lock arrangement, and
   at least one of the actuation arrangement and the lock arrangement are configured so that the lock arrangement moves solely radially into engagement with the pipe.

6. The actuation arrangement of claim 1, wherein the actuation arrangement comprises one or more retainers configured to hold the unactivated lock arrangement in position prior to activation of the lock arrangement.

7. The actuation arrangement of claim 1, wherein the actuation member comprises a cage.

8. The actuation arrangement of claim 1, wherein the lock arrangement comprises a first lock portion and a second lock portion configured to grip the pipe, the first lock portion and the second lock portion comprising ramp profiles.

9. The actuation arrangement of claim 1, wherein the actuation arrangement comprises a lock activation arrangement.

10. The actuation arrangement of claim 9, wherein the lock activation arrangement is mounted on or coupled to the actuation member.

11. The actuation arrangement of claim 10, wherein the lock activation arrangement comprises one or more actuator coupled to a first lock portion and configured to translate the first lock portion axially relative to a second lock portion to urge the second lock portion into engagement with the pipe.

12. The actuation arrangement of claim 1, wherein the actuation arrangement comprises a seal actuation arrangement.

13. The actuation arrangement of claim 12, wherein the seal actuation arrangement is configured to translate the actuation member towards the seal arrangement to urge the seal arrangement into engagement with the pipe.

14. The actuation arrangement of claim 1, wherein the seal arrangement and the lock arrangement are configured to self-lock each other upon actuation of the seal arrangement and the lock arrangement.

15. The actuation arrangement of claim 1, wherein the seal arrangement comprises at least one of a compression seal and at least one face seal element.

16. A method for sealing a pipe, the method comprising the steps of:
  locating the actuation arrangement according to claim 1 about a section of a pipe;
  moving the actuation member axially towards a seal arrangement of a pipe sealing apparatus to urge the seal arrangement into engagement with the pipe, wherein the actuation member is operatively associated with the seal arrangement of the pipe sealing apparatus; and
  activating a lock arrangement disposed on the actuation member to secure the pipe sealing apparatus to the pipe.

17. A pipe sealing apparatus comprising:
  a body;
  a seal arrangement disposed on the body; and
  an actuation member configured for location about a section of a pipe, the actuation member operatively associated with the seal arrangement of the pipe sealing apparatus such that axial movement of the actuation member towards the seal arrangement urges the seal arrangement into engagement with the pipe, wherein the actuation member comprises a body portion configured for location about the pipe and between outside of the pipe and the pipe sealing apparatus, a flange portion, an end portion, and at least one strut disposed between the body portion and the end portion; and
  a lock arrangement configured to secure the pipe sealing apparatus to the pipe, wherein the lock arrangement is disposed on the actuation member.

18. The pipe sealing apparatus of claim 17, wherein at least one of the body of the pipe sealing apparatus comprises a plurality of components and the pipe sealing apparatus comprises a clamp.

19. The pipe sealing apparatus of claim 17, wherein at least one of the body of the pipe sealing apparatus comprises a unitary body and the pipe sealing apparatus comprises a pipe connector.

* * * * *